(12) United States Patent
Matsuda et al.

(10) Patent No.: US 7,161,790 B2
(45) Date of Patent: Jan. 9, 2007

(54) IGNITION DEVICE FOR BUS CONNECTION

(75) Inventors: Kazuo Matsuda, Wako (JP); Kazutaka Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 464 days.

(21) Appl. No.: 10/749,459

(22) Filed: Dec. 30, 2003

(65) Prior Publication Data

US 2005/0188875 A1     Sep. 1, 2005

(51) Int. Cl.
*F23Q 7/00* (2006.01)
*F42B 3/10* (2006.01)

(52) U.S. Cl. .................................... 361/248; 102/202.5

(58) Field of Classification Search ................ 361/248; 102/202.5
See application file for complete search history.

(56) References Cited

U.S. PATENT DOCUMENTS

| | | | |
|---|---|---|---|
| 5,760,489 A | 6/1998 | Davis et al. ................ | 307/10.1 |
| 5,847,309 A | 12/1998 | Baginski | |
| 6,085,659 A * | 7/2000 | Beukes et al. .............. | 102/206 |
| 6,166,452 A * | 12/2000 | Adams et al. ............. | 307/10.1 |
| 6,418,853 B1* | 7/2002 | Duguet et al. .............. | 102/206 |
| 2001/0022146 A1 | 9/2001 | Duvacquier et al. ..... | 102/202.2 |
| 2002/0166472 A1* | 11/2002 | Goernig et al. .......... | 102/202.5 |
| 2002/0166473 A1* | 11/2002 | Goernig et al. .......... | 102/202.5 |

FOREIGN PATENT DOCUMENTS

| | | |
|---|---|---|
| DE | 101 61 515 A | 9/2002 |
| EP | 0 802 092 A1 | 10/1997 |
| JP | 10-154992 | 6/1998 |
| JP | 3064725 | 9/1999 |
| JP | 2000-028140 | 1/2000 |
| JP | 2000-028298 | 1/2000 |
| JP | 2000-241098 | 9/2000 |
| JP | 2001-527204 | 12/2001 |
| WO | WO 02/092400 A1 | 11/2002 |
| WO | WO 02/01078 1 | 1/2003 |

* cited by examiner

*Primary Examiner*—Chau N. Nguyen
*Assistant Examiner*—Scott Bauer
(74) *Attorney, Agent, or Firm*—Carrier, Blackman & Associates, P.C.; Joseph P. Carrier; William D. Blackman

(57) ABSTRACT

A plurality of the ignition devices are connected to an ignition control system via a common bus. The ignition devices are selectively operable for actuating a plurality of airbag devices by means of electrical energy and an electrical signal supplied from the ignition control system. Each ignition device includes an ignition package formed integrally from a communication/ignition circuit and an ignition element provided on a silicon chip. Not only can the dimensions of the ignition device be reduced in comparison with a case in which the communication/ignition circuit and the ignition element are separately provided, but also wiring between the communication/ignition circuit and the ignition element can be completed beforehand when the ignition device is produced, thereby decreasing the number of wiring steps during assembly with the ignition control system.

10 Claims, 5 Drawing Sheets

IGNITION DEVICE FOR BUS CONNECTION

BACKGROUND OF THE INVENTION

1. Field of the Invention

The present invention relates to an ignition device for bus connection, a plurality of the ignition devices being connected to an ignition control system via a common bus, and the ignition devices being selectively operable by means of electrical energy and an electrical signal supplied from the ignition control system.

2. Description of the Related Art

An airbag device mounted in an automobile is arranged so that an airbag is inflated by high pressure gas generated by combustion of a propellant, and an ignition device (an igniter or a squib) for igniting the propellant is provided in the airbag device. The ignition device is connected to an ignition control system, into which an acceleration signal generated upon a vehicle collision is input. Energizing an ignition element of the ignition device generates heat to ignite the propellant, thereby inflating the airbag.

Recent automobiles are equipped with a large number of airbag devices such as an airbag device that deploys from a steering wheel, an airbag device that deploys from a dashboard, an airbag device that deploys from a seat side part, and an airbag device that deploys from a roof side part. Therefore, the number of circuits within the ignition control system have to be increased in line with the number of the airbag devices, and each time the number of airbag devices increases the ignition control system has to be changed even for the same type of vehicle. In each case the production cost increases. Furthermore, if the ignition control system and each of the airbag devices are connected by means of a harness exclusively used therefor, the harness becomes very long, and it is difficult to ensure space for arranging the harness.

U.S. Pat. No. 5,760,489 discloses an arrangement in which a plurality of airbag devices are connected to a common bus extending from an ignition control system, electrical energy for ignition is supplied from the ignition control system to an ignition device of each of the airbag devices, and an electrical signal is also supplied for operating only the ignition device of a predetermined airbag device among the plurality of airbag devices.

In this case, the ignition device of each of the airbag devices requires a communication circuit for communicating with the ignition control system and an ignition circuit for making an ignition element generate heat when it receives an ignition command during the communication. Such an ignition device comprising a communication/ignition circuit is known from U.S. Pat. No. 6,418,853.

Furthermore, when a plurality of airbag devices are simultaneously operated, the sum of electrical energy supplied from the ignition control system to each of the ignition devices increases. In this regard, an ignition element that can generate heat with low electrical energy is known from U.S. Pat. No. 5,847,309.

In the arrangement disclosed in Japanese Patent Application Laid-open No. 2000-241098, the ignition device (an igniter 1) is provided separately with the communication/ignition circuit (an electronic card 17) for outputting an ignition signal in communication with the ignition control system (a central control unit 110), and the ignition element (a resistive heating element 11), which is operated by the ignition signal output from the communication/ignition circuit so as to ignite a propellant (a pyrotechnic ignition composition 7). Therefore, not only do the dimensions of the ignition device increase, but also it is necessary to connect a wire between the communication/ignition circuit and the ignition element when assembling the ignition device, thus disadvantageously increasing the number of assembly steps.

SUMMARY OF THE INVENTION

The present invention has been achieved in view of the above-mentioned circumstances, and it is an object thereof to reduce the dimensions of an ignition device for bus connection and decrease the number of wiring steps during assembly of the ignition device.

In order to accomplish the above object, a first aspect of the present invention provides an ignition device for bus connection, of a type in which a plurality of the ignition devices are connected to an ignition control system via a common bus, and the ignition devices are selectively operable by means of electrical energy and an electrical signal supplied from the ignition control system, wherein the ignition device comprises an ignition package integrally comprising a communication/ignition circuit provided on a silicon chip and an ignition element provided on a silicon chip.

In accordance with this arrangement, the ignition device for bus connection is connected to the ignition control system via the common bus and comprises the ignition package integrally comprising the communication/ignition circuit and the ignition element provided on the silicon chip(s). Therefore, not only can the dimensions of the ignition device for bus connection be reduced in comparison with a case in which the communication/ignition circuit and the ignition element are separately provided, but also wiring between the communication/ignition circuit and the ignition element can be completed beforehand while the ignition device for bus connection is being produced, thereby decreasing the number of wiring steps during assembly of the ignition device with the ignition control system.

Furthermore, in accordance with a second aspect of the present invention, in addition to the first aspect, there is provided an ignition device for bus connection wherein the communication/ignition circuit and the ignition element are provided on the same or common silicon chip.

In accordance with this arrangement, since the communication/ignition circuit and the ignition element are provided on the common silicon chip, the number of components can be reduced in comparison with a case in which the communication/ignition circuit and the ignition element are provided individually on separate silicon chips. Furthermore, a bridge wire for providing a connection between the communication/ignition circuit and the ignition element can be omitted, thereby further reducing the number of components and the number of wiring steps.

Moreover, in accordance with a third aspect of the present invention, in addition to the first or second aspect, there is provided an ignition device for bus connection wherein the ignition package is used as a header of the ignition device.

In accordance with this arrangement, since the ignition package is used as the header, it is unnecessary to provide a special header, thereby contributing to a reduction in the number of components.

Silicon chip 27, or first and second silicon chips 27a and 27b in the disclosed embodiments correspond to the silicon chip of the present invention.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIGS. 1 to 3 illustrate a first embodiment of the present invention wherein,

FIG. 1 is a circuit diagram of a deployment control system for airbag devices;

FIG. 2 is a longitudinal sectional view of an ignition device; and

FIG. 3 is a cross sectional view along line 3—3 in FIG. 2.

DESCRIPTION OF THE PREFERRED EMBODIMENT

Figure 1:
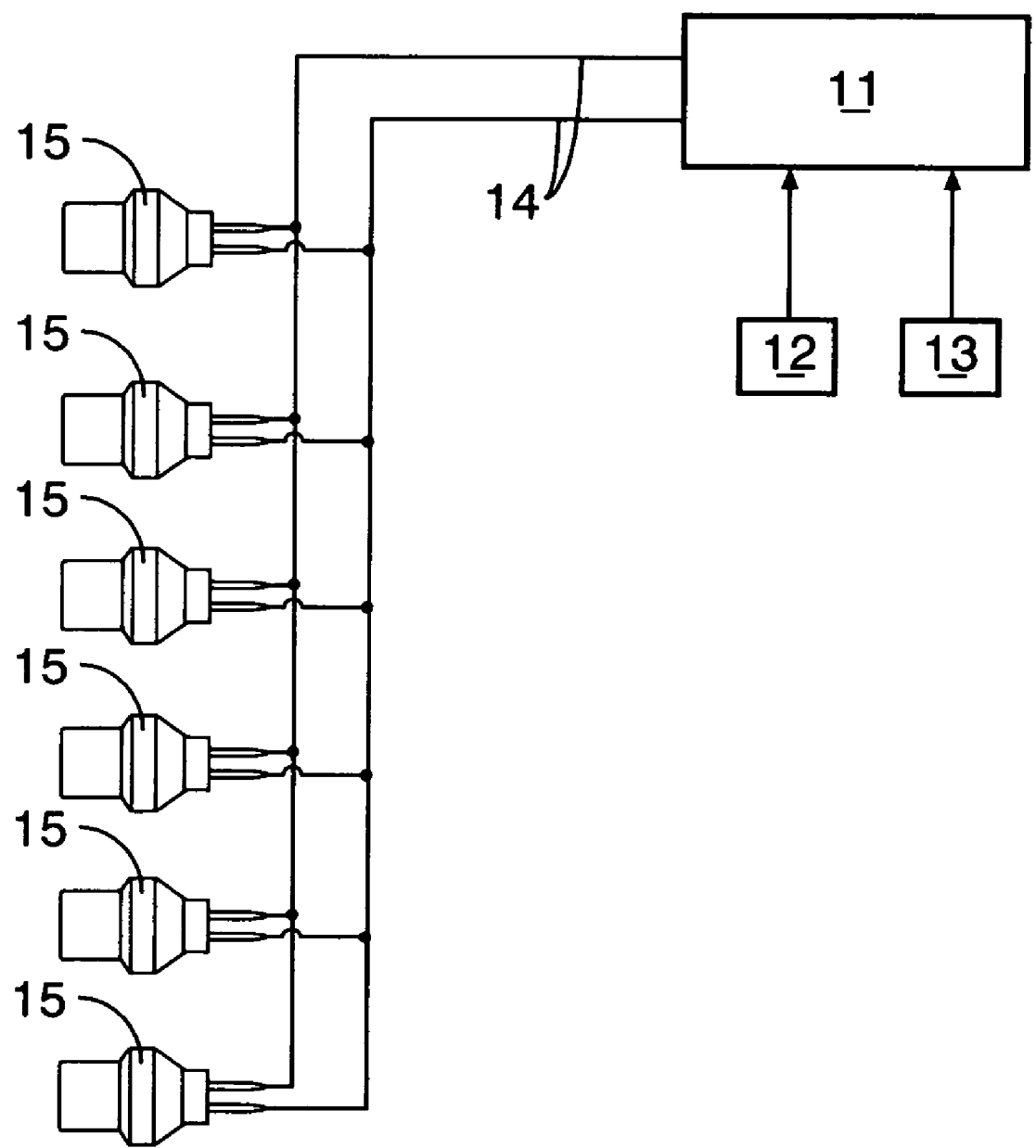

As shown in FIG. 1, connected to an ignition control system 11 for controlling the operation of airbag devices are a first acceleration sensor 12 for detecting a head-on collision of a vehicle, and a second acceleration sensor 13 for detecting a side collision of the vehicle. Connected to a bus 14 extending from the ignition control system 11 are a plurality of ignition devices 15, which are, in the embodiment, a total of six ignition devices 15 provided on each of an airbag device that deploys from a steering wheel, an airbag device that deploys from a dashboard, two airbag devices that deploy from left and right seats, and two airbag devices that deploy from left and right side parts of a roof.

Figure 2:
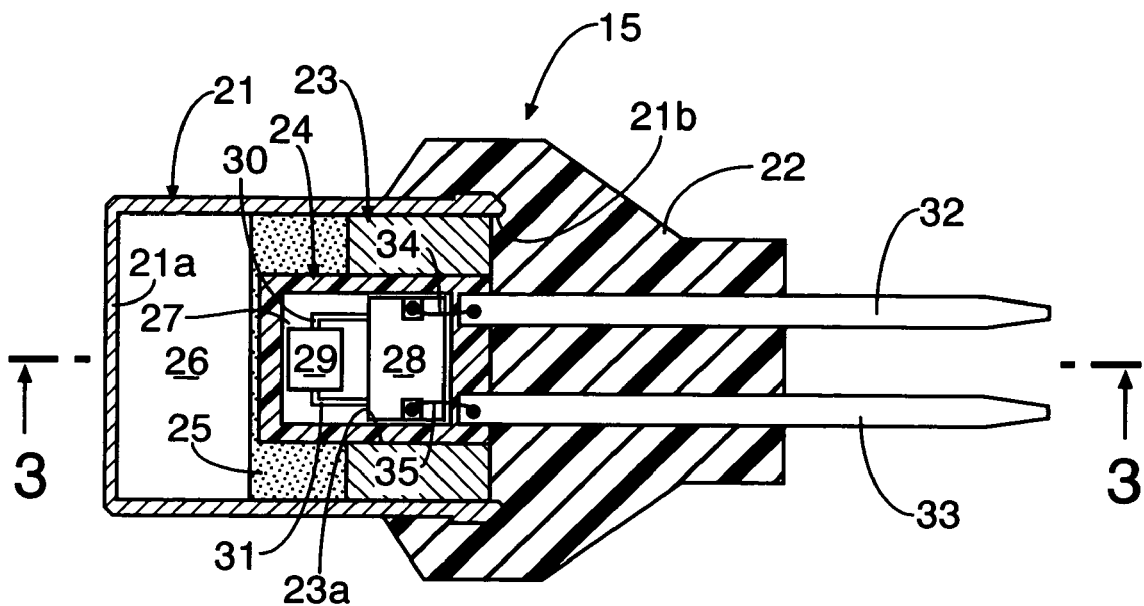
Figure 3:
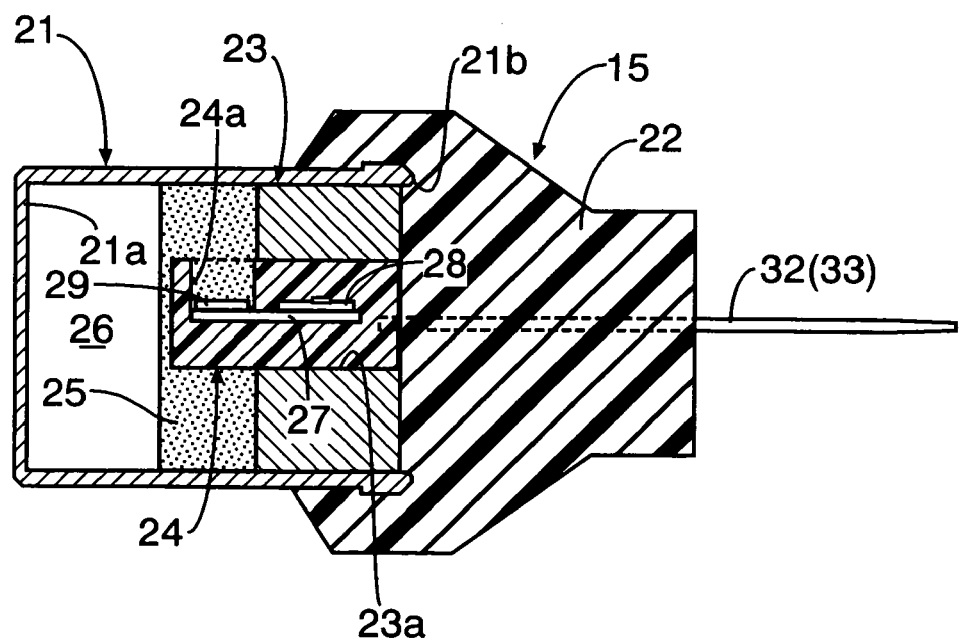

As is clear from FIGS. 2 and 3, each of the ignition devices 15 comprises a cylindrical casing 21 having a bottom 21a, a connector portion 22 joined so as to cover the outer side of an opening 21b of the casing 21, a header 23 fixed so as to block the opening 21b of the casing 21, an ignition package 24 fixed so as to run through a through hole 23a of the header 23, and an igniting agent 25 disposed so as to cover a part of the ignition package 24 projecting from the header 23 toward the bottom 21a of the casing 21. A space 26 is formed between the bottom 21a of the casing 21 and the igniting agent 25.

The ignition device 15 comprises a communication/ignition circuit 28 and an ignition element 29 provided on the surface of a plate-shaped silicon chip 27, and they are connected to each other via leads 30 and 31 printed on the silicon chip 27. Base ends of two pins 32 and 33 running through the connector portion 22 are connected to the communication/ignition circuit 28 via two bridge wires 34 and 35. The silicon chip 27, the communication/ignition circuit 28, the ignition element 29, the two bridge wires 34 and 35, and the base ends of the two pins 32 and 33 are embedded in a synthetic resin, thus forming the ignition package 24. The ignition package 24 has an opening 24a, through which the ignition element 29 is exposed, and the opening 24a is filled with a portion of the igniting agent 25.

The ignition device 15 having such a structure is mounted at a position adjacent to a propellant of an inflator (a gas generating device) of the airbag device, and the two pins 32 and 33 are connected to the bus 14.

When the vehicle is involved in a collision and the first acceleration sensor 12 or the second acceleration sensor 13 detects acceleration at a predetermined value or higher, the ignition control system 11 outputs a deployment command signal to the bus 14 in order to operate a predetermined airbag device. The ignition device 15 of the airbag device into which the deployment command signal has been input determines in the communication/ignition circuit 28 thereof whether or not the deployment command signal is a command to operate its own airbag device and, if it is a command to operate its own airbag device, energizes the ignition element 29 so as to generate heat. The electrical energy for making the ignition element 29 generate heat is stored beforehand in storage means provided in the communication/ignition circuit 28, thereby alleviating the load on the power source when a plurality of airbag devices are operated simultaneously.

When the ignition element 29 generates heat in this way, the igniting agent 25 in contact with the ignition element 29 exposed through the opening 24a of the ignition package 24 ignites to burn, and the resulting heat and pressure break the bottom 21a of the casing 21, causing the propellant of the inflator to ignite and generate high-pressure gas, so that the high-pressure gas deploys the airbag. Since the opening 21b of the casing 21 is blocked by the header 23, the heat and pressure generated by the combustion of the igniting agent 25 can be directed to the bottom 21a of the casing 21.

As described above, since the communication/ignition circuit 28 and the ignition element 29 of the ignition device 15 are integrated and contained within the ignition package 24, the dimensions of the ignition device 15 can be reduced to similar levels to those of a conventional ignition device which is individually connected to the ignition control system 11 without the bus 14. Thus, a conventional airbag device can be connected to the bus 14 without any modification, thereby contributing to a reduction in cost. In this embodiment, since the communication/ignition circuit 28 and the ignition element 29 are provided on the common silicon chip 27, not only can the number of components be reduced and the dimensions of the ignition device 15 be further reduced, but also it is unnecessary to connect a bridge wire between the communication/ignition circuit 28 and the ignition element 29, thereby reducing the number of processing steps. Moreover, since there is no need of special wiring when assembling the ignition device 15, the number of wiring steps can also be reduced.

Figure 4:
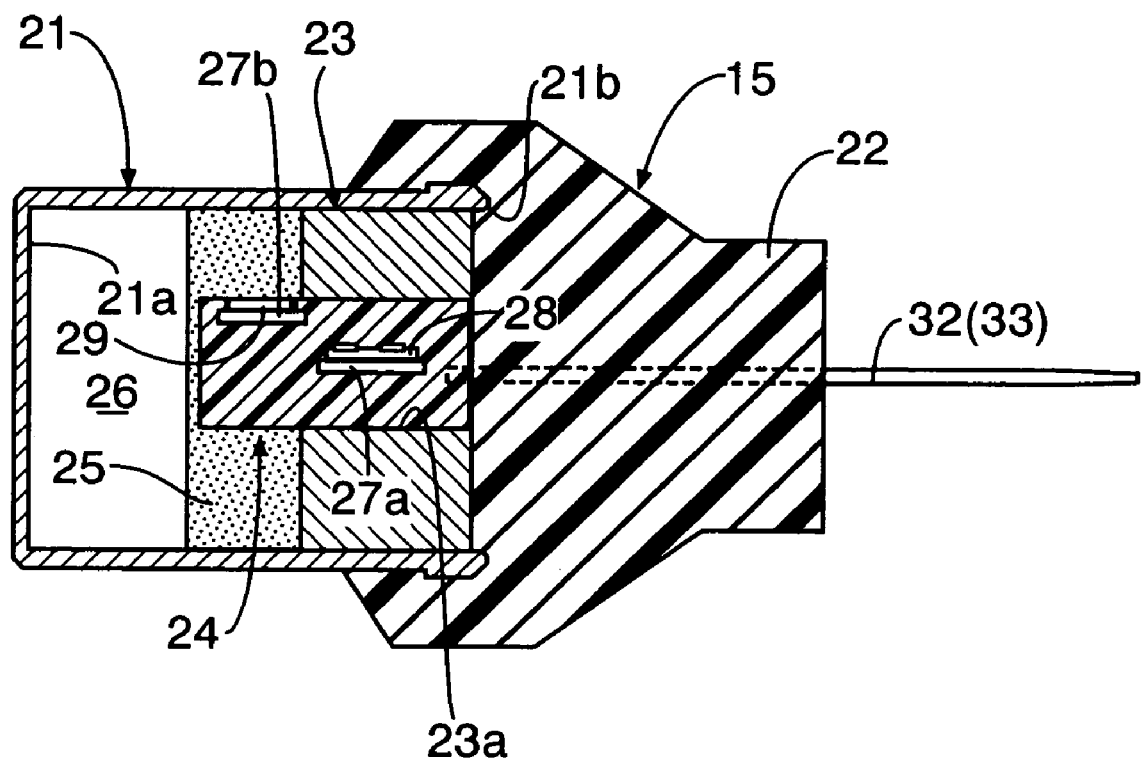
FIG. 4 is a view, corresponding to FIG. 3, of a second embodiment.

A second embodiment of the present invention is now explained with reference to FIG. 4.

In the first embodiment, the communication/ignition circuit 28 and the ignition element 29 are provided on the common silicon chip 27, but in the second embodiment a first silicon chip 27a having a communication/ignition circuit 28 thereon and a second silicon chip 27b having an ignition element 29 thereon are formed as separate members, and the communication/ignition circuit 28 and the ignition element 29 are connected to each other via a bridge wire (not illustrated).

In accordance with the second embodiment, the ignition element 29 can be exposed directly on the surface of an ignition package 24, and it is unnecessary to form an opening 24a (see FIG. 3) in the ignition package 24, thus reducing the number of machining steps. Moreover, since connection of a bridge wire between the communication/ignition circuit 28 and the ignition element 29 can be completed when producing an ignition device 15, there is no need to carry out special wiring when assembling the ignition device 15, thereby reducing the number of wiring steps.

Figure 5:
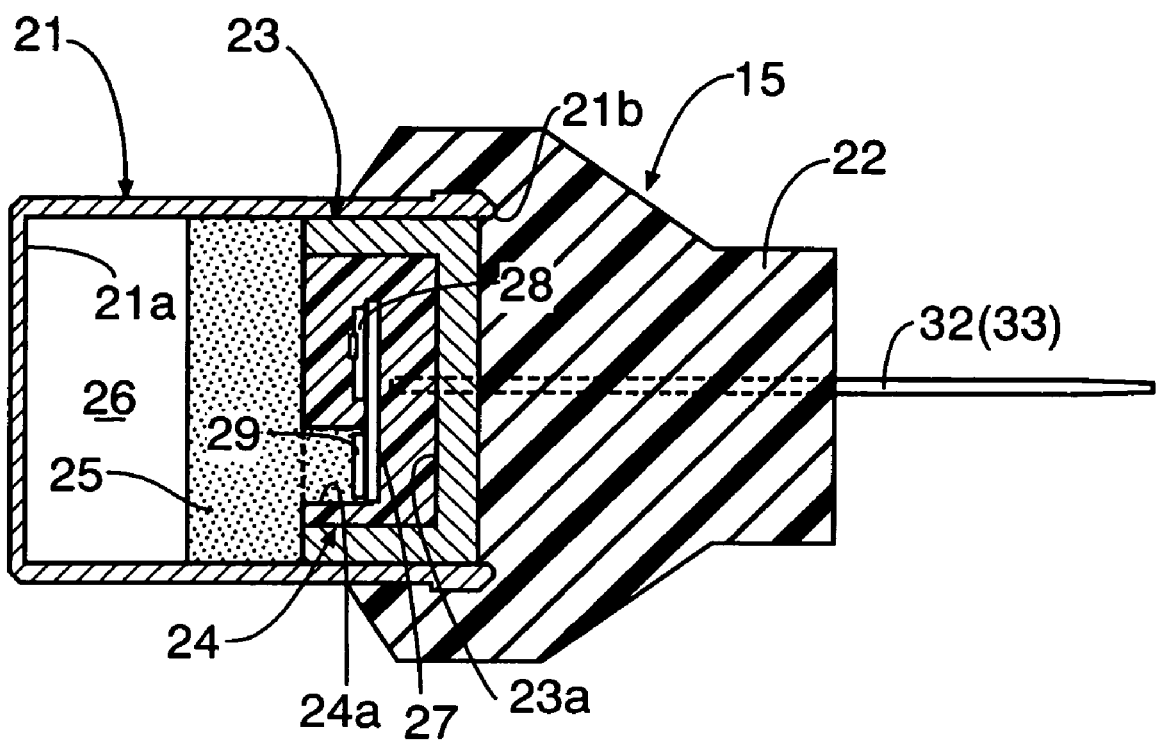
FIG. 5 is a view, corresponding to FIG. 3, of a third embodiment.

A third embodiment of the present invention is now explained with reference to FIG. 5.

In the third embodiment, the ignition package 24 of the first embodiment is turned through 90° so as to make the opening 24a of the ignition package 24 face the back side of the ignition agent 25. This third embodiment can exhibit the same effects as those of the first embodiment.

Figure 6:
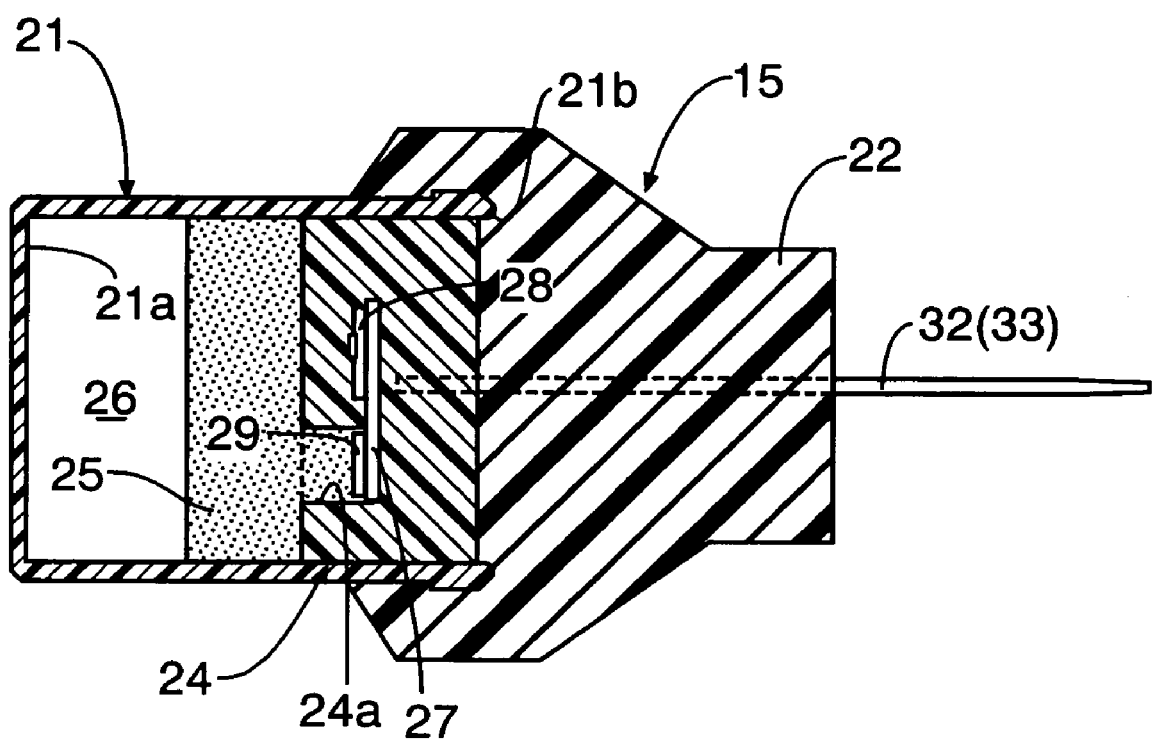
FIG. 6 is a view, corresponding to FIG. 3, of a fourth embodiment.

A fourth embodiment of the present invention is now explained with reference to FIG. 6.

The fourth embodiment is an improvement of the third embodiment; an opening 21b of a casing 21 is blocked directly by means of an ignition package 24, thus omitting the header 23 (see FIG. 5) and further reducing the number of components.

Although embodiments of the present invention are explained in detail above, the present invention can be modified in a variety of ways without departing from the subject matter of the present invention.

For example, in the embodiments, the ignition device for bus connection of the present invention is applicable to an airbag device of an automobile, but it is applicable to a pretensioner of a seat belt system of an automobile, and can also be used in any application other than automobiles.

What is claimed is:

1. An ignition device for bus connection, of a type in which a plurality of the ignition devices are connected to an ignition control system via a common bus, and the ignition devices are selectively operable by means of electrical energy and an electrical signal supplied from the ignition control system, wherein the ignition device comprises:

an ignition package integrally comprising a communication/ignition circuit provided on a first silicon chip and an ignition element provided on a second silicon chip, wherein the first and second silicon chips are completely enclosed within and supported by a single synthetic resin body such that the first silicon chip is supported independently of the second silicon chip, and wherein the synthetic resin body has an opening defined therein, and said ignition element is disposed in said opening in contact with an igniting agent.

2. The ignition device for bus connection according to claim 1, wherein the ignition package is used as a header of the ignition device.

3. The ignition device for bus connection according to claim 1, wherein the ignition element is disposed on an outer surface of the ignition package in contact with an igniting agent.

4. The ignition device for bus connection according to claim 1, wherein said communication/ignition circuit and said ignition element are electrically connected within said ignition package.

5. The ignition device for bus connection according to claim 1, further comprising pins which electrically connect the ignition package to the common bus, said pins being electrically connected to said communication/ignition circuit.

6. An ignition device for bus connection, of a type in which a plurality of the ignition devices are connected to an ignition control system via a common bus, and the ignition devices are selectively operable by means of electrical energy and an electrical signal supplied from the ignition control system, wherein the ignition device comprises:

an ignition package integrally comprising a communication/ignition circuit provided on a silicon chip and an ignition element also provided on the silicon chip, the silicon chip, the communication/ignition circuit, and the ignition element being completely enclosed within and supported by a single synthetic resin body, the synthetic resin body having an opening defined therein, and said ignition element is disposed in said opening in contact with an igniting agent, a casing which houses the ignition package therein, the casing having a single open end, and a header disposed in the casing, the header configured to close the open end of the casing, the header supporting the synthetic resin body within the casing.

7. The ignition device for bus connection according to claim 6, wherein the ignition package is formed integrally with the header of the ignition device.

8. The ignition device for bus connection according to claim 6, wherein the ignition package has an opening defined therein, and said ignition element is disposed in said opening in contact with an igniting agent.

9. The ignition device for bus connection according to claim 6, wherein said communication/ignition circuit and said ignition element are electrically connected within said ignition package.

10. The ignition device for bus connection according to claim 6, further comprising pins which electrically connect the ignition package to the common bus, said pins being electrically connected to said communication/ignition circuit.

* * * * *